US012470863B2

(12) United States Patent
Liang et al.

(10) Patent No.: US 12,470,863 B2
(45) Date of Patent: Nov. 11, 2025

(54) WEARABLE SOUND DEVICE AND METHOD FOR VENTILATION AND ACOUSTIC TUNING

(71) Applicant: xMEMS Labs, Inc., Santa Clara, CA (US)

(72) Inventors: Jemm Yue Liang, Sunnyvale, CA (US); Robb Zimmerman, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/069,239

(22) Filed: Mar. 4, 2025

(65) Prior Publication Data

US 2025/0287141 A1 Sep. 11, 2025

Related U.S. Application Data

(60) Provisional application No. 63/562,583, filed on Mar. 7, 2024.

(51) Int. Cl.

*H04R 1/28* (2006.01)
*H04R 1/02* (2006.01)
*H04R 3/04* (2006.01)

(52) U.S. Cl.

CPC ........... *H04R 1/2803* (2013.01); *H04R 1/023* (2013.01); *H04R 1/2811* (2013.01); *H04R 3/04* (2013.01); *H04R 2460/11* (2013.01)

(58) Field of Classification Search

CPC .... H04R 1/023; H04R 1/1016; H04R 1/2803; H04R 1/2811; H04R 3/04; H04R 2460/11
See application file for complete search history.

(56) References Cited

U.S. PATENT DOCUMENTS

| | | | | |
|---|---|---|---|---|
| 11,943,585 B2 * | 3/2024 | Liang | H04R 1/025 | |
| 2022/0103934 A1 * | 3/2022 | Ilkorur | H04R 9/06 | |
| 2023/0260494 A1 * | 8/2023 | Wargnier | G10K 11/002 | 181/198 |
| 2023/0319460 A1 * | 10/2023 | Zhang | H04R 9/06 | 381/345 |

* cited by examiner

*Primary Examiner* — Huyen D Le
(74) *Attorney, Agent, or Firm* — Winston Hsu

(57) ABSTRACT

A wearable sound device includes a sound outlet, a side opening, an air pulse generating (APG) device, and an exchanger. The exchanger includes a first opening, a second opening, a third opening, and a fourth opening. The first opening and the second opening are on a first side of the exchanger facing a first chamber, and the third opening and the fourth opening are on a second side of the exchanger facing the sound outlet. The APG device produces a first airflow flowing through a first air pathway between an ambient and the third opening. A second airflow flows through a second air pathway between the fourth opening and the side opening. The first air pathway and the second air pathway are isolated from each other.

20 Claims, 7 Drawing Sheets

WEARABLE SOUND DEVICE AND METHOD FOR VENTILATION AND ACOUSTIC TUNING

CROSS REFERENCE TO RELATED APPLICATIONS

This application claims the benefit of U.S. Provisional Application No. 63/562,583,filed on Mar. 7, 2024. The content of the application is incorporated herein by reference.

BACKGROUND OF THE INVENTION

1. Field of the Invention

The present application relates to a wearable sound device, a ventilation method, and an acoustic tuning method thereof, and more particularly, to a wearable sound device, a ventilation method, and an acoustic tuning method thereof capable of preventing condensation.

2. Description of the Prior Art

Unless otherwise indicated herein, the approaches described in this section are not prior art to the claims in this application and are not admitted as prior art by inclusion in this section.

In most earbuds currently available on the market (e.g., those with dynamic drivers (DD), balanced armature (BA) drivers, planar drivers, air motion transformer (AMT) drivers, or other conventional moving membrane speakers), the air within a listener's ear canals is isolated from the ambient environment. This isolation is maintained as the membrane movements of these speakers generate sound.

Unlike the aforementioned conventional earbuds, the pump-like behavior of an MEMS (Micro-Electro-Mechanical Systems) earbud disrupts the "ear canal to ambient isolation" by exchanging air between a listener's ear canal and the environment. While this is generally not an issue in mild weather, it becomes problematic during harsh deep winter.

In sub-zero temperatures, condensation may occur inside MEMS earbuds as ear canal air (e.g., T=37° C., RH=80-95%) encounters cold ambient air (e.g., T=−10° C.), similar to frost on a near-freezing car windshield. If MEMS earbuds are used during freezing winter or left freezing in the cold for a few hours, condensation can freeze water or mist near the narrow gaps (e.g., 0.8-2.5 μm) between the flap pairs of a MEMS earbud, restricting the motion of the membrane and leading to device failure.

Therefore, how to avoid condensation is a significant objective in the field.

SUMMARY OF THE INVENTION

It is therefore a primary objective of the present application to provide a wearable sound device, a ventilation method, and an acoustic tuning method thereof, to improve over disadvantages of the prior art.

An embodiment of the present application discloses a wearable sound device, comprising a sound outlet and a side opening; an air pulse generating (APG) device, configured to produce an audible sound via generating a plurality of air pulses; and an exchanger; wherein the APG device produces a first airflow flowing via a first air pathway through the exchanger between an ambient and the sound outlet; wherein a second airflow flows via a second air pathway through the exchanger between the sound outlet and the side opening; wherein the first air pathway and the second air pathway are isolated from each other.

An embodiment of the present application discloses a ventilation method, for a wearable sound device, comprising directing a first airflow flowing via a first air pathway through an exchanger between an ambient and a sound outlet of the wearable sound device; and directing a second airflow flowing via a second air pathway through the exchanger between the sound outlet and a side opening of the wearable sound device; wherein the wearable sound device comprises the sound outlet, the side opening, an air pulse generating (APG) device, and the exchanger; wherein the first airflow is produced by the APG device; wherein the first air pathway and the second air pathway are isolated from each other.

An embodiment of the present application discloses an acoustic tuning method, for a wearable sound device, comprising directing a first airflow flowing via a first air pathway through an exchanger; or directing a second airflow flows via a second air pathway through the exchanger; wherein the wearable sound device comprises the exchanger; wherein the first air pathway and the second air pathway are isolated from each other.

These and other objectives of the present invention will no doubt become obvious to those of ordinary skill in the art after reading the following detailed description of the preferred embodiment that is illustrated in the various figures and drawings.

DETAILED DESCRIPTION

The measured performance of an air pulse generating (APG) device, e.g., the one taught by U.S. application Ser. No. 18/321,759, in the occluded earbud emulator, e.g., IEC711, outperforms over existing sound transducers in aspects such as frequency range (e.g., 20 Hz-20 kHz), SPL (capable of 143 dB in IEC711 or 120 dB at 20 Hz in vented earbud), THD (<0.25% for 20 Hz-1 kHz at SPL>105 dB), to name just a few. Such exceptional performance may lead to proliferation of APG-based consumer products (such as earbuds) being introduced to the market.

However, the APG device may be susceptible to condensation. For example, an APG device may comprise flap(s) or gap(s). When the air within a listener's ear canal, with high absolute humidity and relatively high temperature, mixes with the colder air outside of the ear canal (e.g., during freezing winter), moisture accumulating in the gap(s) or adhering to the flap(s) is potentially frozen into ice. This condensation may compromise the functionality of the APG device, but may be resolved by appropriately ventilating, dissipating heat, redistributing thermal energy, or reducing humidity.

Figure 1:
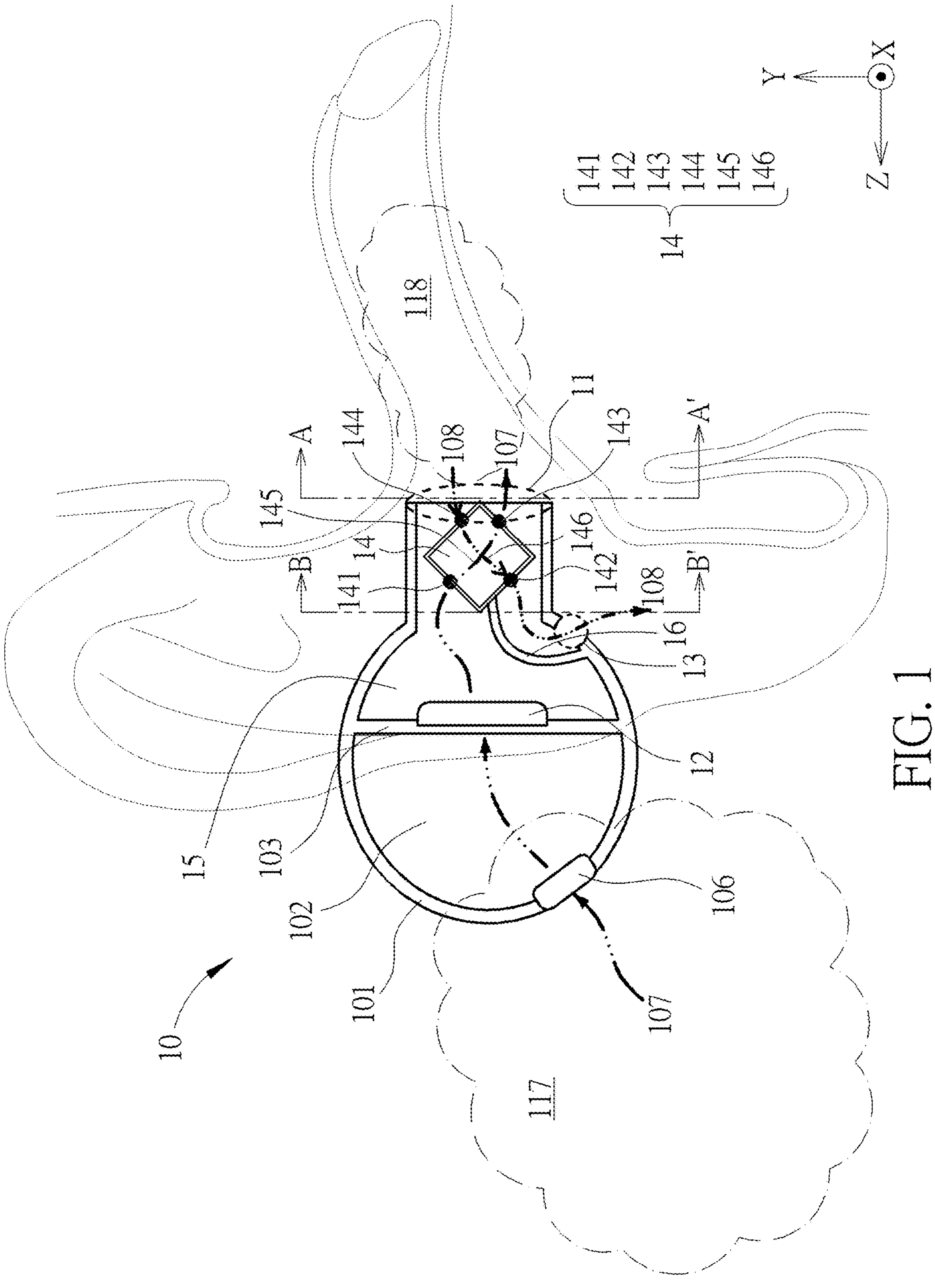
FIG. 1 and FIG. 2 are schematic diagrams of wearable sound devices according to embodiments of the present application.

For example, the present invention proposes a wearable sound device 10 shown in FIG. 1. The wearable sound device 10 comprises an APG device 12 and an exchanger 14.

The APG device 12 may be an APG device taught in U.S. application Ser. No. 18/321,759, and configured to produce sound via generating a plurality of air pulses or airflow pulses.

The exchanger 14 may have similar structure with a heat/air exchanger. For example, within the (heat) exchanger, two sets of conduits/channels are created, two fluidic flows (e.g., air flow or liquid flow) flow in opposite directions within the (heat/air) exchanger. Note that, in the (heat/air) exchanger, the two fluidic flows exchange energy or heat with each other while the two fluidic flows are isolated from each other.

The exchanger 14 may help prevent condensation or improve device lifespan. For example, the exchanger 14 may lower the temperature of the air within a listener's ear canal 118, raise the temperature of the air from outside, or minimize the temperature difference between different spots within the wearable sound device 10.

In an embodiment shown in FIG. 1, the exchanger 14 may comprise a conduit/guide/channel 145, which is connected between openings 141 and 143 or connecting the openings 141 and 143, to guide a (first) airflow. The opening 143 is positioned near/by a side A-A' of the exchanger 14 and faces/connects to a sound outlet 11 of the wearable sound device 10; the opening 141 is positioned near/by a side B-B' of the exchanger 14 and faces/connects to a (front) chamber 15. The sound outlet 11 may be oriented toward the ear canal 118. The APG device 12 may produce the (first) airflow flowing through an air pathway 107 between the ambient 117 and the sound outlet 11.

As shown in FIG. 1, the exchanger 14 may comprise a conduit/guide/channel 146, which is connected between openings 142 and 144 or connecting the openings 142 and 144, to guide a (second) airflow. The opening 144 is located near/by the side A-A' and faces/connects to the sound outlet 11. The opening 142 is located near/by the side B-B'. Although the side B-B' directs towards the front chamber 15, the opening 142 or the conduit 146 is not physically connected to the front chamber 15. Instead, the opening 142 is isolated from the front chamber 15 by a partition 16 and physically connects to a side opening 13, such that the ear canal 118 is directly connected to the ambient 117. The (second) airflow may flow through an air pathway 108 between the sound outlet 11 and the side opening 13, without connecting to/with the front chamber 15. In other words, the partition 16 isolates the air pathway 108 from the front chamber 15.

With the conduits/channels 145 and 146 of high thermal conductivity (e.g., higher than that of air), the exchanger 14 may reduce the temperature difference. Specifically, heat is transferred between the first and second airflows, which may move in the opposite directions. In other words, cold air from the ambient 117 may enter the wearable sound device 10 and travel through the air pathway 107/108, while warm and humid air from the ear canal 118 may travel through the air pathway 108/107. Through heat transfer, the temperature of the air in the conduit/channel 145 may rise gradually from the side B-B' towards the side A-A', reducing the temperature difference between the air from the ear canal 118 and the air from the ambient 117. Similarly, the air in the conduit/channel 146 may be cooled gradually from the side A-A' toward the side B-B', reducing the temperature difference between the air from the ambient 117 and the air from the ear canal 118. In other words, heat transfer between the conduits/channels 145 and 146 minimizes the temperature difference, reducing the chance/risk of condensation.

Noted that, the exchanger 14 transfers heat from warm air to cold air without direct contact because the two airflows are physically isolated. In other words, air particles within the conduit/channel 145 neither mixes nor comes into contact with air particles within the conduit/channel 146. Instead, the air pathways 107 and 108 are isolated from each other. On the other hand, the airflow entering the ear canal 118 (e.g., via the air pathway 107) mixes with the air pre-existing within the ear canal 118. The air exiting the ear canal 118 (e.g., via the air pathway 108) may be pushed out from this mixed air within the ear canal 118 due to the (increased) pressure within the ear canal 118.

To prevent condensation from forming within the APG device 12, the temperature mixing point should be positioned as far away from the APG device 12 as possible. For example, the length of the sound tube is used to create the conduits/channels 145 and 146 of the exchanger 14. Alternatively, the exchanger 14 may be placed at the tip of the sound tube or near a bud (e.g., 219) of the wearable sound device 10, which is the farthest point relative to the APG device 12. This arrangement prevents immediate mixing of cold air around the APG device 12 with warmer air from the ear canal 118, thereby minimizing (chance of) condensation within the APG device 12.

To further reduce (chance of) condensation, the absolute humidity of the air in the ear canal 118 should be reduced. For example, the air from the ambient 117, with its low absolute humidity, absorbs more moisture from the air in the ear canal 118. Besides, in terms of accompanying ventilation, when the APG device 12 produces sound or music, airflow pulses are generated, which sweeps humid air out of the ear canal 118. In terms of active ventilation, the APG device 12 may generate airflow pulses to dry the ear canal 118 without making a sound. These drying effects help prevent condensation.

Figure 2:
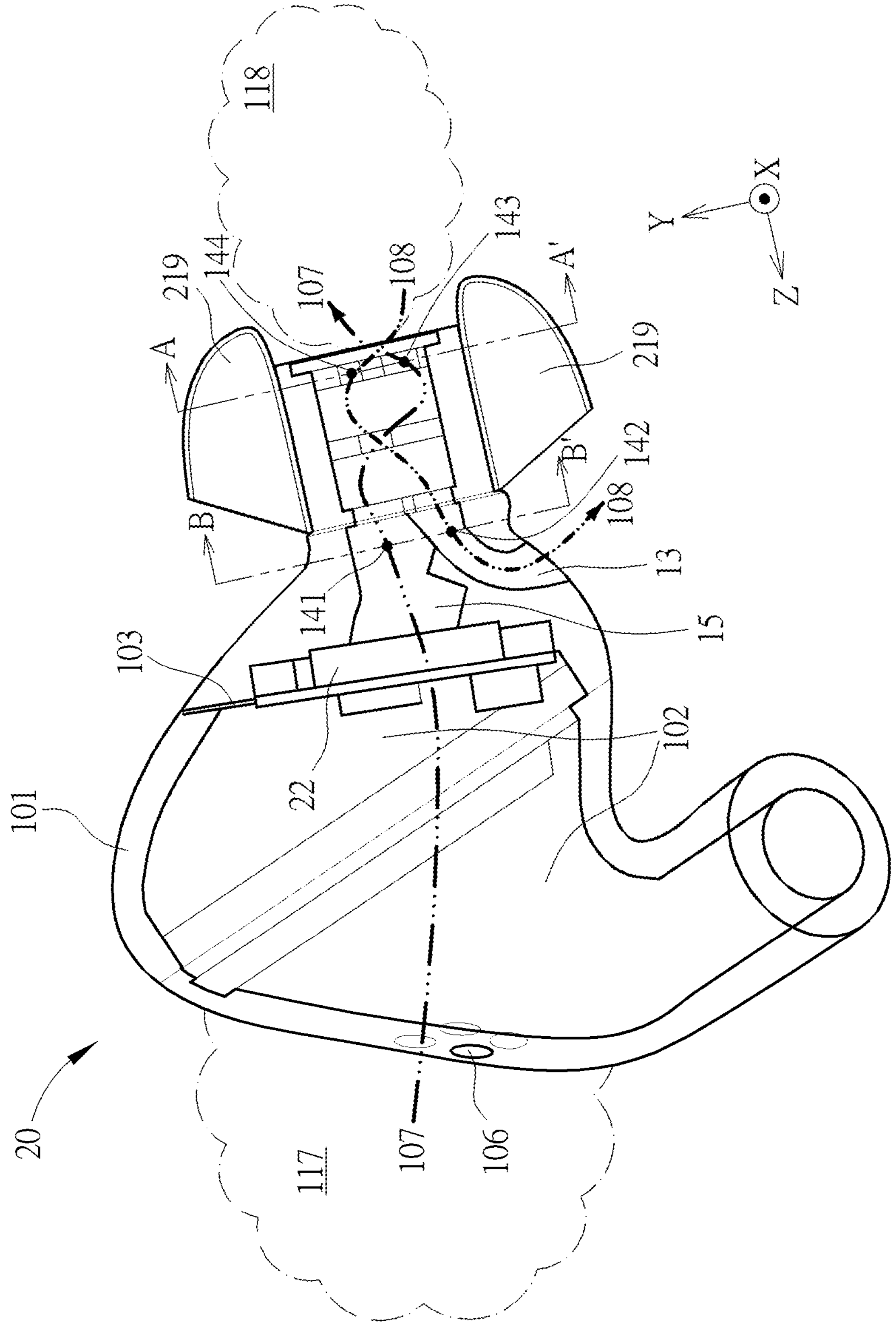

For example, FIG. 2 illustrates a wearable sound device 20, which may implement the device 10. An APG device 22 of the wearable sound device 20 may initiate air movement, which results in airflow(s) in an exchanger 24 of wearable sound device 20.

Accompanying/Natural Ventilation

Figure 5:
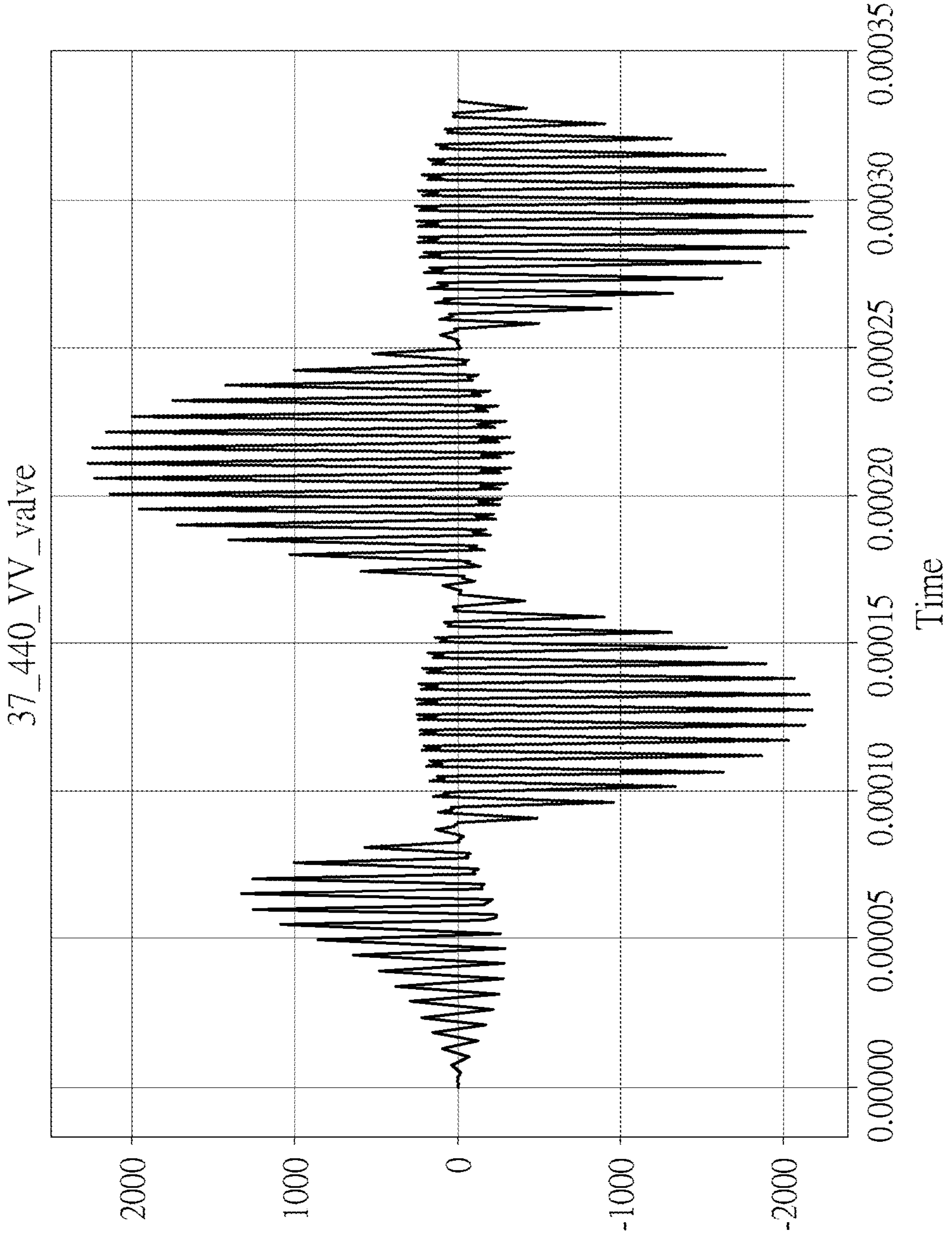
FIG. 5 is a volume velocity plot according to an embodiment of the present application.

During sound production operation, the APG device 22 may push/pull air toward/from the ear canal 118, thereby offering the accompanying/natural ventilation may be viewed as a byproduct of the sound production operation. As shown in a volume velocity plot of FIG. 5, if the APG device 22 produces a 6 kHz tone, which comprises 32 pulses in one period, a net negative (or positive) air volume movement is generated by each pulse within the period of the 6 kHz. The pulse-by-pulse net air volume movements either push air from the front chamber 15 towards the ear canal 118 through the air pathway 107 or pull air from the ear canal 118 back to the front chamber 15 through the air pathway 107. Correspondingly, the pressure within the ear canal 118 may rise (or fall) proportionally, and audible sound is perceived by the listener/user. Consequently, sound production operation not only minimizes the temperature difference between the air in the ambient 117 and the air in the ear canal 118 but also reduces the absolute humidity of the air in the ear canal 118.

However, accompanying/natural ventilation is not always perfect. For example, when sound production operation is paused, condensation may occur. Additionally, the effectiveness of accompanying/natural ventilation caused by sound production operation depends on the relationship between the spectral compositions of the produced sound and a corner frequency $f_c$ (of the acoustic tuning of the conduit/channel 146). It is because the air pathway 108 acts as a low pass filtered version of the air pathway 107. Specifically, similar to a cavity, the ear canal 118 may accumulate and smoothen out high-frequency changes in pressure, resulting in a low pass filtering effect. When the rate of this rising (or falling) pressure is sufficiently slow (e.g., at a sound frequency below the corner frequency $f_c$), an airflow flowing in the opposite direction of the airflow along the air pathway 107 is generated along the air pathway 108. Therefore, the effectiveness of accompanying/natural ventilation caused by sound production operation is weak when the APG device 22 generates only sound of frequency significantly higher than the corner frequency $f_c$, but is stronger when the APG device 22 generates sound of low registers.

Active Ventilation

The present invention thus introduces active ventilation. An (accompanying or byproduct) airflow for accompanying ventilation may correspond to audible frequencies (e.g., 20 Hz), while an (active) airflow for active ventilation may correspond to inaudible frequencies (e.g., 6 Hz). However, the airflow for accompanying ventilation or active ventilation may be different from or independent of a natural convection airflow caused by temperature differences. Correspondingly, control signal(s) for driving the APG device 22 may be modified, such that the APG device 22 generate the (active) airflow beyond what is intended by audible sound signal(s) to offer active ventilation, in addition to the (accompanying) airflow caused by the audible sound signal(s) to offer the accompanying ventilation.

AC Airflow for Active Ventilation

Figure 6:
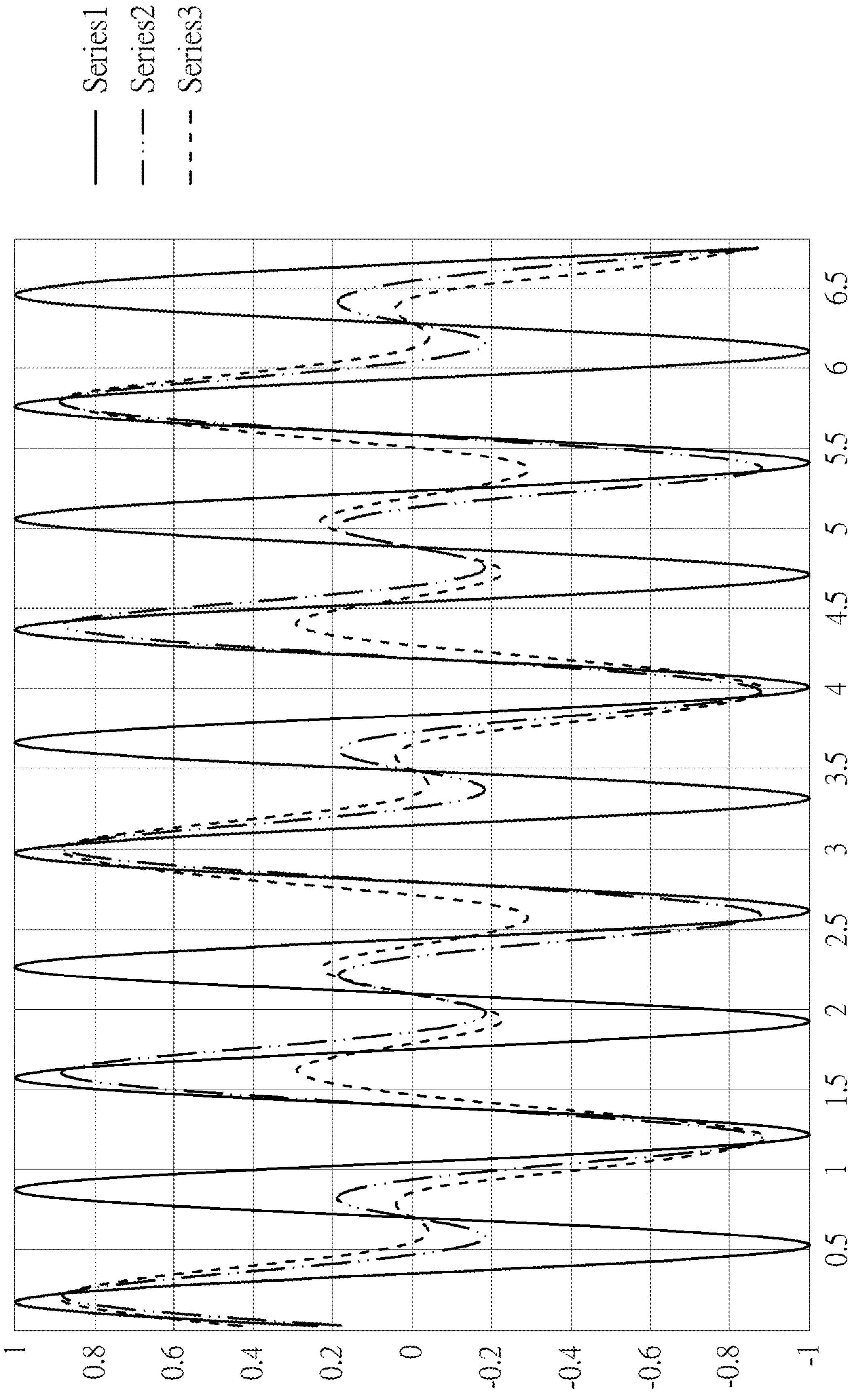
FIG. 6 illustrates three AC airflow patterns according to embodiments of the present application.

In an embodiment of the active ventilation, airflow pulses with time-varying (or alternating current (AC)) envelop are produced by the APG device of the present application, where spectral component(s) of the envelop of the airflow pulses is lower than a lowest audible frequency, e.g., 16 Hz. For example, FIG. 6 illustrates three AC airflow patterns: a solid line representing a single tone AC airflow pattern (e.g., 9 Hz), a dot-dot-dashed line representing a 2-tone AC airflow pattern (e.g., 9 Hz and 4.5 Hz), and a dashed line representing a 3-tone AC airflow pattern (e.g., 9 Hz, 4.5 Hz, and 2.25 Hz). The 2-tone (or 3-tone) AC airflow pattern exhibits one amplitude swing (or two amplitude swings) between a pair of larger amplitude swings. Herein AC airflow pattern may be referred to AC envelop of airflow pulses produced by the present application. These smaller amplitude swings enhances heat transfer between the air within the air pathways 107 and 108, and thus reduce the temperature difference of the air when they emerge from the conduit/channel 145 or 146.

To generate AC airflow or airflow pulses with AC envelop, a control signal for driving the APG device 22 is generated by modifying digital (audio) data for sound production operation before a digital-to-analog converter (DAC) converts the digital (audio) data into an analog signal for a controller/driver of the APG device 22. This (digital) approach has the lowest overhead, is more manageable, and offers more flexibility to incorporate new features via over-the-air (OTA) firmware updates. This enables parameters to be tuned or new features to be added, thereby providing continuous improvement to end customers throughout the product life cycle.

Alternatively, to generate AC airflow or airflow pulses with AC envelop, a control signal for driving the APG device 22 is generated by embedding an AC signal source within a controller/driver of the APG device 22, where the AC (source) signal is corresponding to the AC envelop. This (analog) approach may be more practical during the product development phase, as it requires minimal effort from System-on-a-Chip (SoC) firmware developer(s).

DC Airflow for Active Ventilation

In another embodiment of the active ventilation, airflow pulses with time-invariant (or direct current (DC)) envelop, flowing in a fixed direction, are produced by the APG device of the present application. This DC airflow or airflow pulses with DC envelop, which may combine with the (accompanying) airflow intended for producing audible sound, may move from the ambient 117, through the exchanger 14, and to the ear canal 118 along the air pathway 107. In other words, along with or in addition to air pulses or airflow pulses corresponding to audible sound, the APG device may also produce airflow pulses with DC envelop so as to offer active ventilation. The DC airflow may also create a corresponding pressure within the ear canal 118, which induces an opposing DC airflow that flows from the ear canal 118, through the exchanger 14, and to the sound outlet 11 along the air pathway 108. These DC airflows also help reduce condensation.

To generate DC airflow or airflow pulses with DC envelop, a control signal for driving the APG device 22 is generated by adding/superimposing a DC offset voltage onto an audio signal. This DC offset voltage causes the APG device 22 to generate a DC airflow or airflow pulses with DC envelop, where the DC offset voltage is corresponding to the DC envelop. The direction of the DC airflow (e.g., flowing from the APG device 22 to the ear canal 118 along the air pathway 107) is determined by the sign of the DC offset voltage.

To generate a DC offset voltage, a digital offset is added to digital (audio) data for sound production operation before it is converted by the DAC. For example, for 16 bit-per-sample audio, a digital offset ranging from 16 (0.05%, −66 dB/FS) to 1024 (3.1%, −30 dB/FS) may be added to each digital (audio) data before it is fed to the DAC. The digital offset, even at its maximum value (e.g., 1024), does not significantly reduce the dynamic range.

Figure 7:
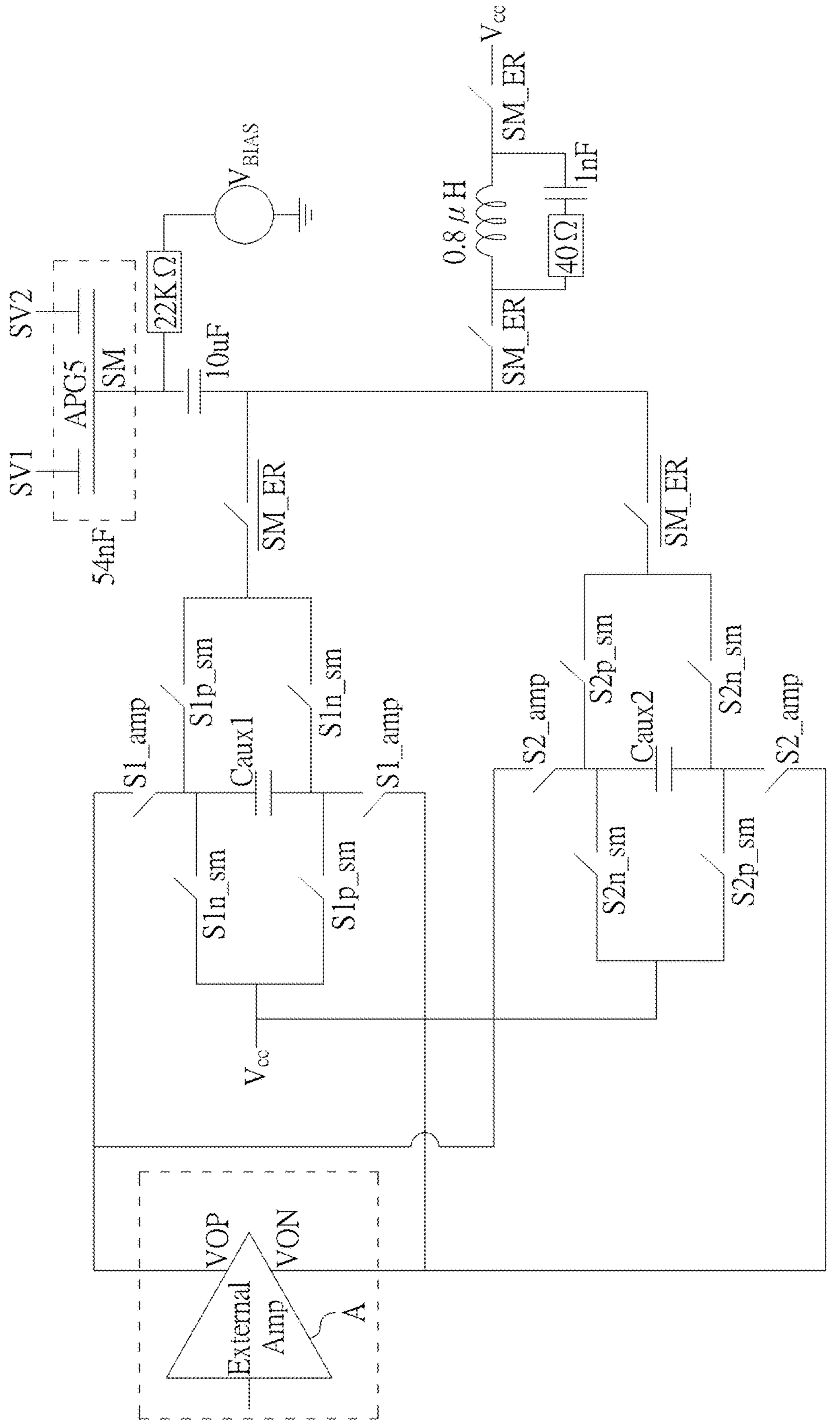
FIG. 7 is a schematic diagram of a driving signal generator according to embodiments of the present application.

Alternatively, to generate a DC-like offset voltage, a driving signal generator (e.g., one disclosed in U.S. application Ser. No. 18/665,525) may be modified. For example, as shown in FIG. 7, a first switch selectively connects a first branch, biased with a voltage $V_{BIAS}$, to an output terminal of the driving signal generator, while a second switch selectively connects a second branch, which comprises a capacitor (e.g., 10 μF) and is biased with a voltage $V_{BIAS}+V_{OFFSET}$, to the output terminal. These two switches alternately connect to the two branches, such that the first branch is connected to the output terminal during the first half of each pulse and the second branch is connected to the output terminal during the second half of each pulse. Switches $\overline{\text{SM\_ER}}$ are performed logically by switch S1p_sm, 1n_sm, S2p_sm, or S2n_sm. Details of capacitors 1nF, 10 μF, Caux1, Caux2, an equivalent capacitance 54nF, resistors 22 kΩ, 40Ω, an inductor 0.8 μH, an amplifier A, switches S1_amp, S1n_sm, S1p_sm, S2_amp, S2n_sm, S2p_sm, SM_ER, $\overline{\text{SM\_ER}}$, an APG device APG5, or voltages SM, SV1, SV2 VOP, VON, $V_{cc}$, $V_{BIAS}$ may be described in U.S. application Ser. No. 18/665,525. This scheme is competitive when power amplifier(s) is/are added after the DAC to boost low impedance load driving capability, and DC-decoupling capacitor(s) is/are inserted after the power amplifier(s).

Construction

In FIG. 2, the exchanger 24 is created by utilizing inner volume of the sound tube and transforming the inner volume into a conduit set, which comprises one conduit (e.g., 145) connecting the ear canal 118 to the front chamber 15 and another conduit (e.g., 146) connecting the ear canal 118 to the side opening 13. In the present application, the term "conduit" and "channel" within the exchanger may be used interchangeably.

Figure 3:
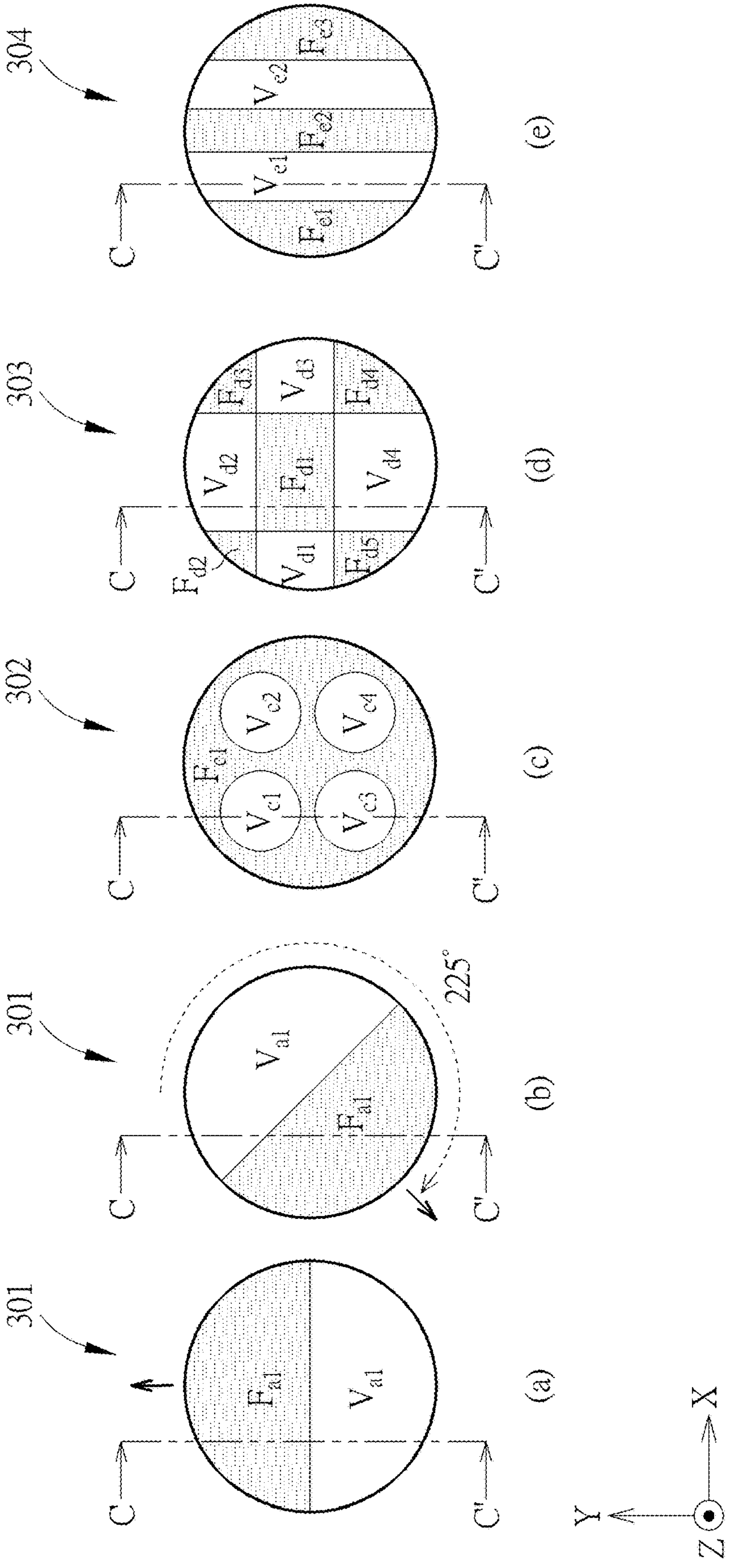
FIG. 3 is a front view of a schematic diagram of cross sections of exchangers according to embodiments of the present application.
Figure 4:
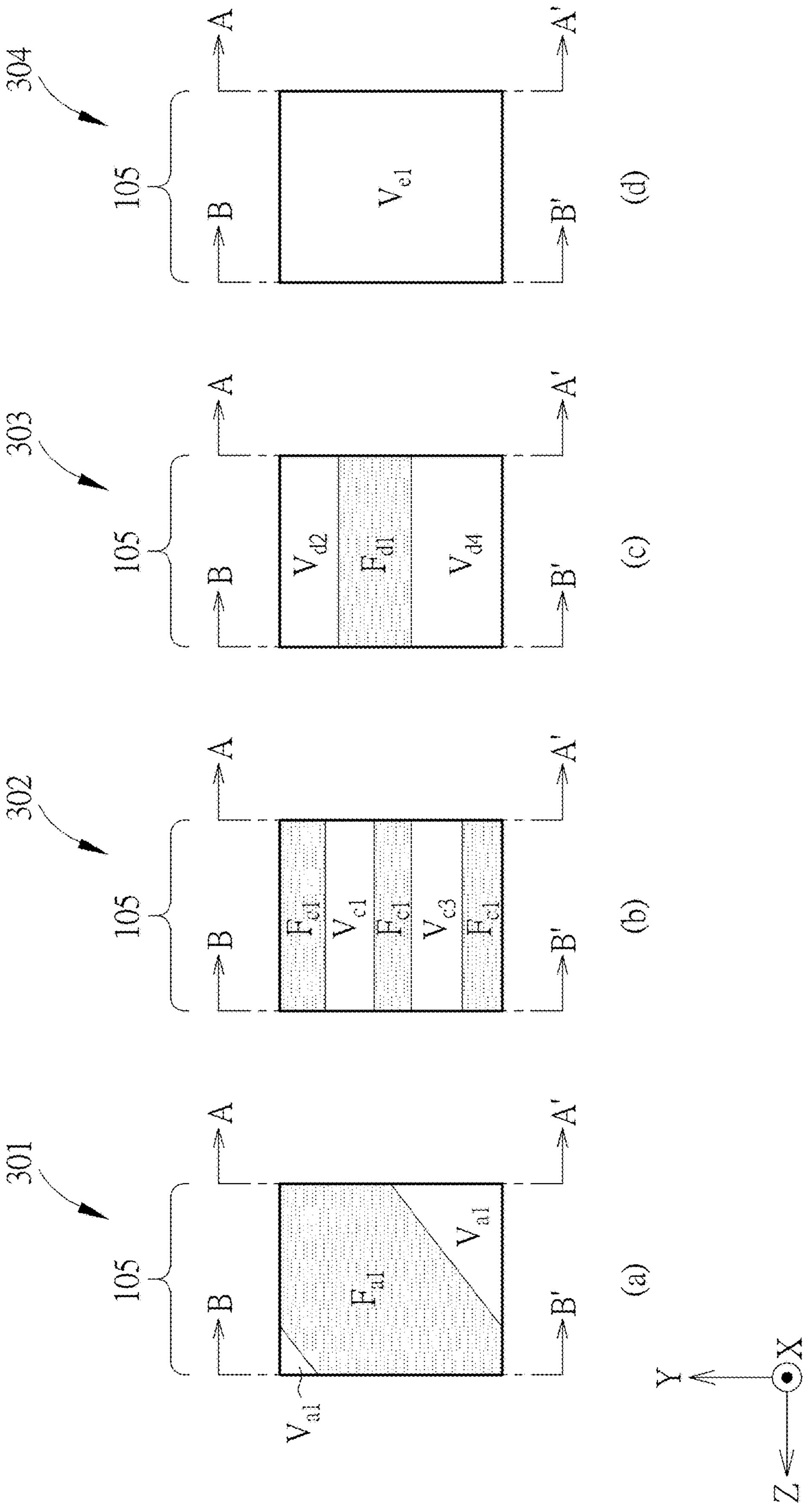
FIG. 4 is a side view of a schematic diagram of the cross sections shown in FIG. 3.

However, an exchanger may comprise more conduits/channels with various arrangements. For example, FIGS. 3 and 4 depict a front view and a side view of cross sections 301-304 of exchangers, each of which may implement the exchanger 14, according to embodiments of the present application.

The cross section 301 shows two conduits $F_{a1}$ and $V_{a1}$ (one for 145 and another for 146 as an embodiment). FIG. 3(*a*) may illustrate the cross section 301 taken along the side A-A', while FIG. 3(*b*) may illustrate the cross section 301 taken along the side B-B'. As shown in FIG. 4(*a*), the conduits $F_{a1}$ and $V_{a1}$ may be twisted by 225° across the length of its exchanger (or roughly the length of the sound tube) between the sides A-A' and B-B'. Twisting the conduit $V_{a1}$ increases its equivalent length, thereby increasing the reactance of impedance or improving heat transfer efficiency.

More generally, like most heat exchangers, the first and second conduits/channels are interleaved or interlaced with each other, thereby enlarging contact surface therebetween and improving heat transfer efficiency.

The cross section 302 shows five conduits $F_{c1}$ and $V_{c1}$-$V_{c4}$. In FIGS. 3(*c*) and 4(*b*), the conduits $V_{c1}$-$V_{c4}$ are enclosed by the conduit $F_{c1}$. This arrangement fully utilizes all available surface area of the conduits $V_{c1}$-$V_{c4}$, benefiting heat transfer.

In another aspect, comparing FIGS. 3(*a*) and (*c*), a conduit (i.e., $V_{a1}$) may be split into several smaller conduits (e.g., $V_{c1}$-$V_{c4}$), which may increase the reactance of impedance. The conduits $V_{c1}$-$V_{c4}$ of the cross section 302 may extend from the sound outlet 11 to side opening(s) (e.g., 13), while the conduit $F_{c1}$ of the cross section 302 may extend from the front chamber 15 to the sound outlet 11. By designing the geometries of the conduits $V_{c1}$-$V_{c4}$, the reactance of impedance of the conduits $V_{c1}$-$V_{c4}$ may be adjusted to achieve resonance with the capacitance of the ear or the capacitance of its wearable sound device (e.g., 10) at 2-3 kHz, thereby boosting sound pressure level (SPL).

For example, as shown in FIG. 3(*c*), each conduit $V_{c1}$-$V_{c4}$ has a circular cross section. However, since a circle normally has the shortest perimeter among all geometries, a conduit may have an irregular shape.

For example, a conduit $F_{d1}$ in FIG. 3(*d*) has a rectangular or square cross section. Besides, conduits $F_{d1}$-$F_{d5}$ and $V_{d1}$-$V_{d4}$ of the cross section 303 may exhibit different geometries, which may be useful for tuning the quality (Q) factor of resonance. For example, as shown in FIGS. 3(*d*) and 4(*c*), the conduit $V_{d4}$, with a quadrilateral-like shape, may be the largest, while the conduit $F_{d2}$, with a triangular-like shape, may be the smallest.

Alternatively, conduits $F_{e1}$-$F_{e3}$ and $V_{e1}$-$V_{e2}$ of the cross section 304 in FIGS. 3(*e*) and 4(*d*) have narrow, bar-like shapes, which feature high boundary-to-area ratio. Consequently, more than 85% of the available boundary around the conduits $V_{e1}$ and $V_{e2}$ is utilized for heat transfer. Besides, the smaller the diameter or width of a conduit (e.g., $V_{e1}$), the higher the reactance of impedance may be.

Each of the cross sections 301-304 shown in FIG. 3 has a circular contour, but is not limited thereto. For example, a cross section may have an irregular contour that matches the appearance of a housing of the wearable sound device (e.g., 10 or 20). Similarly, instead of the rectangular contours 301-304 shown in FIG. 4, a cross section taken along line C-C' may has a trapezoid contour, which tapers from the side B-B' to the side A-A'.

In FIG. 1, 2, or 4, the sides A-A' and B-B' are parallel, but is not limited thereto. For example, the side A-A' may be oriented differently/non-paralleled from the side B-B'.

Referring back to FIG. 1 or 2, both a front chamber (e.g., 15) and a back chamber (e.g., 102) are acoustically defined with respect to its APG device (e.g., 12). For example, a film structure of the APG device or a mounting plate (e.g., 103), upon which the APG device is mounted, may divide the inner space of its wearable sound device (e.g., 10 or 20) into the front chamber and the back chamber. The front chamber may acoustically connect one side of a film structure of the APG device toward exchanger(s) or the sound outlet (e.g., 11). As a result, sound generated by the APG device can travel from the front chamber to the sound outlet, and then into a listener's ear canal (e.g., 118). The back chamber, on the other hand, is acoustically coupled to the opposite side of the film structure and may connect to the ambient through its orifice (e.g., 106). Generally, a user seldom senses any significant air pressure change of the back chamber.

The orifice(s) (e.g., 106) or the side opening(s) (e.g., 13) may serve as super vent(s). The second air pathway (e.g., 108), with the help of exchanger(s) (e.g., 14 or 24) and the first air pathway (e.g., 107), not only provides functions of occlusion-relief and acoustic tuning but also adds features such as maintaining dryness of a listener's ear canal (e.g., 118) or minimizing the temperature difference. Therefore, the side opening(s) or the orifice(s) may be regarded as an enhanced version of venting device(s).

The arrangement of side opening(s) (e.g., 13) is sophisticatedly designed. For example, the side opening may be located adjacently to the front chamber (e.g., 15). Alternatively, the side opening or the conduit (e.g., 146) connecting to the side opening is isolated from the front chamber. Alternatively, the side opening is located between the sound outlet (e.g., 11) and the orifice (e.g., 106). Alternatively, the side opening is oriented differently from or perpendicularly to the sound outlet or the orifice. Alternatively, the projection of the side opening onto the APG device (e.g., 12) does not overlap with the projection of the sound outlet (or the orifice) onto the APG device.

Similarly, the arrangement of exchanger(s) (e.g., 14 or 24) is sophisticatedly designed. For example, the exchanger is located adjacently to the front chamber (e.g., 15) but, strictly speaking, not within the front chamber. Alternatively, exchanger(s) may be disposed within the front chamber or the back chamber.

Furthermore, the conduits/channels (e.g., 145/146) within the exchanger may be sophisticatedly designed to meet certain specific frequency response requirements, e.g., booting an SPL at a range of 2K-3 KHz. The conduits/channels (e.g., 145/146) within the exchanger may be designed to a) provide occlusion relief while present resistance necessary to achieve target SPL for f<65 Hz; or b) create resonance to boost SPL between 2K-3K Hz. In other words, the conduits/channels (e.g., 145/146) within the exchanger may be sophisticatedly designed for acoustic tuning.

A wearable sound device (e.g., 10 or 20) may further comprise an air filter, which fills the corresponding orifice (e.g., 106). A housing (e.g., 101) of the wearable sound device, which encloses the APG device or the exchanger(s), may define an orifice, which is located between the back chamber and the ambient (e.g., 117), or the sound outlet, which is located between the front chamber and the ear canal. Due to a narrow gap between a flap pair of the APG device, it may be vulnerable to damage from dust or small particles. Air filter(s) in the orifice(s) serve(s) to prevent such contaminants from entering the back chamber.

A wearable sound device (e.g., 10 or 20) may further comprise a bud (e.g., 219) surrounding the sound outlet (e.g., 11) of the housing (e.g., 101). The bud, positioned on the end of the wearable sound device, may be made of rubber, foam, or silicone materials.

The wearable sound device (e.g., 10, or 20) may be an in-ear device, earbud, earphone, TWS (TWS: true wireless stereo), headphone, or hearing aid. The orifice (e.g., 106) or the side opening (e.g., 13) may be a Micro Electro Mechanical System (MEMS) device or a venting device for forming a dynamic or static vent. The APG device (e.g., 12 or 22) may be or comprise any type of electroacoustic transducer (e.g., a MEMS device), any type of speaker, or a combination thereof.

Details or modifications of a wearable sound device, an APG device, or a venting device are disclosed in U.S. application Ser. No. 17/842,810, Ser. No. 17/344,980, Ser. No. 17/344,983, Ser. No. 17/720,333, Ser. No. 18/172,346, Ser. No. 18/303,599, Ser. No. 18/366,637, Ser. No. 18/530,235, Ser. No. 18/321,759, Ser. No. 18/321,753, Ser. No. 18/321,757, Ser. No. 18/321,752, Ser. No. 18/624,105, and U.S. Provisional Application No. 63/320,703, the disclosure of which is hereby incorporated by reference herein in its entirety and made a part of this specification.

For example, as detailed in U.S. application Ser. No. 18/624,105, an APG device may produce (asymmetric) air pulses, which form a net airflow constantly toward a single direction. The direction of the net airflow may be related to a DC offset voltage in a driving signal or the phase between the driving signal and another driving signal.

To sum up, the wearable sound device of the present application offers a heat transfer function to avoid device failure caused by condensation in harsh weather conditions. As set forth above, exchanger(s) are included for heat transfer, and side opening(s) are introduced to facilitate the intake and exhaust of airflow(s). Additionally, the exchanger(s) may be designed with acoustic or fluid dynamics considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable sound device, comprising:

a sound outlet and a side opening;

an air pulse generating (APG) device, configured to produce an audible sound via generating a plurality of air pulses; and an exchanger;

wherein the APG device produces a first airflow flowing via a first air pathway through the exchanger between an ambient and the sound outlet;

wherein a second airflow flows via a second air pathway through the exchanger between the sound outlet and the side opening;

wherein the first air pathway and the second air pathway are isolated from each other.

2. The wearable sound device of claim 1, wherein the second airflow is isolated from the first airflow or a first chamber between the APG device and the exchanger.

3. The wearable sound device of claim 1, further comprising:

an air filter, for preventing contaminants from entering the wearable sound device.

4. The wearable sound device of claim 1, wherein a control signal for driving the APG device or a driver for the APG device comprises an alternating current (AC) signal or a direct current (DC) offset voltage, which is superimposed onto an audible audio signal.

5. The wearable sound device of claim 1, wherein the exchanger comprises a first opening, a second opening, a third opening and a fourth opening;

wherein the first opening and the second opening are on a first side of the exchanger facing a first chamber between the APG device and the exchanger within the wearable sound device, and the third opening and the fourth opening are on a second side of the exchanger facing the sound outlet of the wearable sound device;

wherein the first side is opposite to the second side;

wherein the first airflow produced by the APG device flows via the first air pathway through the first opening and the third opening;

wherein the second airflow flows via the second air pathway through the second opening, the fourth opening and the side opening.

6. The wearable sound device of claim 5, wherein the exchanger comprises:

a first channel connecting the first opening and the third opening; and a second channel connecting the second opening and the fourth opening.

7. The wearable sound device of claim 1, wherein the first air pathway and the second air pathway twist around each other or are interleaved with each other.

8. The wearable sound device of claim 1, comprising:

a partition, configured to isolate the second air pathway from a first chamber between the APG device and the exchanger.

9. The wearable sound device of claim 1, wherein the APG device produces airflow pulses with an alternating current (AC) envelop, and a frequency of the AC envelop is less than a lowest audible frequency.

10. The wearable sound device of claim 1, wherein the APG device produces airflow pulses with a direct current (DC) envelop corresponding to a DC offset voltage.

11. The wearable sound device of claim 1, wherein the exchanger comprises:

a first channel, configured to guide the first airflow; and a second channel, configured to guide the second airflow.

12. The wearable sound device of claim 11, wherein the first channel and the second channel within the exchanger are designed for acoustic tuning.

13. The wearable sound device of claim 11, wherein the first channel and the second channel within the exchanger are designed for occlusion relief to achieve a specific sound pressure level (SPL) for a specific spectrum.

14. The wearable sound device of claim 11, wherein the first channel and the second channel within the exchanger are designed for creating a resonance to enhance sound pressure level (SPL) for a specific spectrum.

15. The wearable sound device of claim 11, wherein the first channel or the second channel has a cross section with a circular shape, a cross section with a quadrilateral-like shape or a cross section with a triangular-like shape.

16. The wearable sound device of claim 1, wherein the first airflow and the second airflow flow in opposite directions.

17. A ventilation method, for a wearable sound device, comprising:

directing a first airflow flowing via a first air pathway through an exchanger between an ambient and a sound outlet of the wearable sound device; and directing a second airflow flowing via a second air pathway through the exchanger between the sound outlet and a side opening of the wearable sound device;

wherein the wearable sound device comprises the sound outlet, the side opening, an air pulse generating (APG) device, and the exchanger;

wherein the first airflow is produced by the APG device;

wherein the first air pathway and the second air pathway are isolated from each other.

18. The ventilation method of claim 17, comprising:

directing the first airflow flowing via the first air pathway through the exchanger between the ambient and a third opening; and directing a second airflow flowing via the second air pathway through the exchanger between a fourth opening and the side opening;

wherein the exchanger comprises a first opening, a second opening, the third opening, and the fourth opening;

wherein the first opening and the second opening are on a first side of the exchanger facing a first chamber, and the third opening and the fourth opening are on a second side of the exchanger facing the sound outlet.

19. An acoustic tuning method, for a wearable sound device, comprising:

directing a first airflow flowing via a first air pathway through an exchanger while directing a second airflow flowing via a second air pathway through the exchanger in a direction opposite to that of the first airflow;

wherein the wearable sound device comprises the exchanger;

wherein the first air pathway and the second air pathway are isolated from each other.

20. The acoustic tuning method of claim 19, wherein the exchanger comprises a first channel to guide the first airflow and a second channel to guide the second airflow;

wherein the first channel and the second channel within the exchanger are designed for creating a resonance to enhance sound pressure level (SPL) for a specific spectrum.

* * * * *